(No Model.)

E. MATHIS.
HORSESHOE.

No. 458,181. Patented Aug. 25, 1891.

Witnesses —
E. J. Slough.
A. Keithley.

Inventor.
Ellis Mathis
By W. V. Tefft
Atty.

United States Patent Office.

ELLIS MATHIS, OF GLASFORD, ILLINOIS.

HORSESHOE.

SPECIFICATION forming part of Letters Patent No. 458,181, dated August 25, 1891.

Application filed February 16, 1891. Serial No. 381,739. (No model.)

*To all whom it may concern:*

Be it known that I, ELLIS MATHIS, a citizen of the United States, residing at Glasford, in the county of Peoria and State of Illinois, have invented certain new and useful Improvements in Horseshoes; and I do hereby declare that the following is a full, clear, and exact description of the invention, which will enable others skilled in the art to which it appertains to make and use the same.

My invention relates to certain new and useful improvements in horseshoes, by means of which certain objects or advantages are gained by simple addition to the ordinary shoe, which will be more particularly specified hereinafter in this specification.

More particularly my invention relates to a horseshoe provided with an extension from its forward part or toe with a view of lengthening the leverage of the shoe.

That my invention may be more fully understood, reference is had to the accompanying drawings, in which—

Figure 1:
Figure 1:
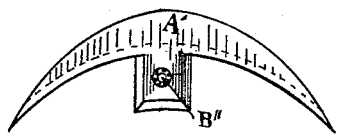
Figure 1:
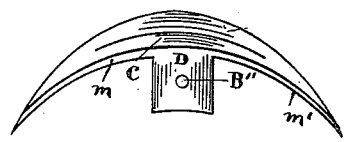
Figure 1:
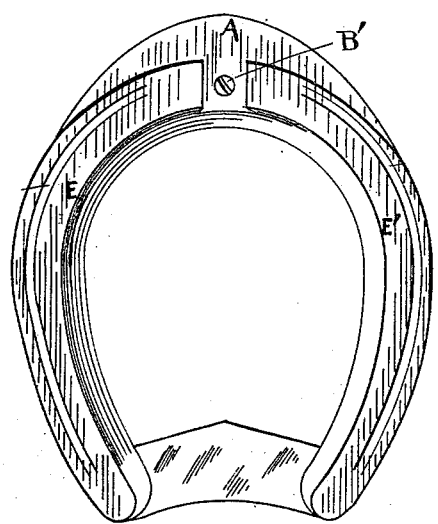
Figure 1:
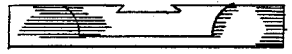
Figure 1:
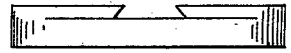
Figure 1:
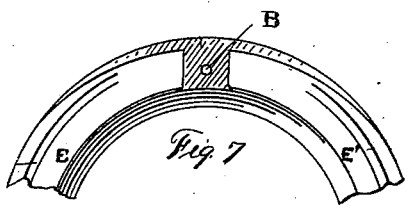

Figure 1 is an end view of a detachable extension for a horseshoe. Fig. 2 is a detail view of the detachable extension, showing its dovetail attachment means. Fig. 3 is also a detail view of the toe extension. Fig. 4 is a plan view of the bottom of a horseshoe with the toe extension attached. Fig. 5 is a detail view of a horseshoe viewed from its rearward end and showing a dovetail slot. Fig. 6 is a detail view of a horseshoe with the extension detached. Fig. 7 is a detail view showing the forward end of a horseshoe having a dovetail slot and a flange or rim at its forward extremity.

In Fig. 4, E E' is a horseshoe provided with a dovetail slot on the side of the shoe next to the ground, into which is inserted the dovetail tongue D, the same being a part of the extension A. As will be seen in Fig. 7, where the extension is detached there is the perforation B threaded for the reception of the screw B', and there is also provided a narrow bearing-rim at its extreme forward part.

As will be seen from Fig. 2, A' represents the lower surface, and C, in Fig. 3, the upper face of the extension. The rounded edge of the upper face of the extension is a narrow flange or rim $m\ m'$, made to conform with a narrow flange or rim upon the shoe before described in connection with Fig. 7.

B" is a perforation in the dovetail tongue. The shape of the extension is made to conform with the forward end of the shoe.

It is well known among horsemen that in training of horses at the trot or pace that there is difficulty in getting them in balance, which results from an unequal front and hind stride, which results in injury to heels and quarters in the front feet. It has been attempted to obviate this difficulty by growing long toes, lowering the heels, supplying heavy shoes and toe-weights, thus altering the natural form of the hoof and changing the natural angle of the ground-surface of the hoof, resulting in injury to the bones of the foot and producing an undue tension upon the tendons and ligaments connected therewith. By the use of my improvement these difficulties are obviated and the natural form of the foot and its natural angle are maintained, and by the extension of the toe of the shoe by the attachment of a detachable toe extension to the shoe or making the extension integral therewith the desired longer leverage is obtained without changing the natural angle of the foot and gives perfect balance between hind and front stride, enabling the horse to go steady at the trot or pace, and renders the work of the joint and tendons perfectly natural and easy.

The toe extension is so constructed that it may or may not be used as is desired, and may be made of different lengths for different uses. The toe extension may be made solid with the shoe or detachably connected therewith by any suitable means, and the form of the toe-piece may be varied to suit the application in which it may be desired to be used.

Having thus fully described my invention, what I claim, and desire to secure by Letters Patent, is—

In combination with a horseshoe having the dovetail slot and the narrow flange at the forward end, the extension A, having the narrow flange $m\ m'$, and the dovetail tongue D, with corresponding perforations in the dovetail tongue and the dovetail slot for the reception of the screw B', all substantially as described and set forth.

In testimony whereof I affix my signature in presence of two witnesses.

ELLIS MATHIS.

Witnesses:
L. W. MATHIS,
R. N. M'CORMICK.